United States Patent
Unno et al.

(10) Patent No.: US 12,334,563 B2
(45) Date of Patent: Jun. 17, 2025

(54) NI-PLATED STEEL FOIL FOR NICKEL-HYDROGEN SECONDARY BATTERY CURRENT COLLECTOR, NICKEL-HYDROGEN SECONDARY BATTERY CURRENT COLLECTOR, AND NICKEL-HYDROGEN SECONDARY BATTERY

(71) Applicant: NIPPON STEEL Chemical & Material Co., Ltd., Tokyo (JP)

(72) Inventors: Hiroto Unno, Tokyo (JP); Masahiro Fukuda, Tokyo (JP); Naoki Fujimoto, Tokyo (JP); Tatsuo Nagata, Tokyo (JP)

(73) Assignee: NIPPON STEEL CHEMICAL & MATERIAL CO., LTD., Tokyo (JP)

(*) Notice: Subject to any disclaimer, the term of this patent is extended or adjusted under 35 U.S.C. 154(b) by 505 days.

(21) Appl. No.: 17/915,435

(22) PCT Filed: Mar. 24, 2021

(86) PCT No.: PCT/JP2021/012383
§ 371 (c)(1),
(2) Date: Sep. 28, 2022

(87) PCT Pub. No.: WO2021/200506
PCT Pub. Date: Oct. 7, 2021

(65) Prior Publication Data
US 2023/0146305 A1   May 11, 2023

(30) Foreign Application Priority Data

Mar. 31, 2020  (JP) .................................. 2020-064395
Mar. 31, 2020  (JP) .................................. 2020-065084

(51) Int. Cl.
| | | |
|---|---|---|
| H01M 4/66 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/12 | (2006.01) | |
| C22C 38/14 | (2006.01) | |

(52) U.S. Cl.
CPC ........... *H01M 4/667* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *H01M 4/669* (2013.01)

(58) Field of Classification Search
None
See application file for complete search history.

(56) References Cited

U.S. PATENT DOCUMENTS

| | | | |
|---|---|---|---|
| 2014/0287259 A1 | 9/2014 | Ishizuka et al. | |
| 2015/0037684 A1 | 2/2015 | Ishizuka et al. | |
| 2017/0170436 A1 | 6/2017 | Ibaragi et al. | |
| 2018/0069268 A1* | 3/2018 | Nakamura | H01M 10/0587 |
| 2022/0209243 A1* | 6/2022 | Kawamura | H01M 4/662 |

FOREIGN PATENT DOCUMENTS

| | | |
|---|---|---|
| JP | 60-233868 A | 11/1985 |
| JP | 6-310126 A | 11/1994 |
| JP | 8-310147 A | 11/1994 |
| JP | 2001-85015 A | 3/2001 |
| JP | 2013-222696 A | 10/2013 |
| JP | 2014-19948 A | 2/2014 |
| JP | 6124801 B2 | 5/2017 |
| WO | WO 2013/157598 A1 | 10/2013 |
| WO | WO 2013/157800 A1 | 10/2013 |
| WO | WO 2016/013575 A1 | 1/2016 |

* cited by examiner

*Primary Examiner* — Kevin M Bernatz
(74) *Attorney, Agent, or Firm* — Birch, Stewart, Kolasch & Birch, LLP

(57) ABSTRACT

A high-strength steel foil for the positive and negative electrode current collectors of nickel-hydrogen secondary batteries which uses a light weight and economical steel foil and which is thin and strong and has excellent rust resistance and resistance to metal ion leaching. Also, a high-strength steel foil for the positive and negative electrode current collectors of nickel-hydrogen secondary batteries which has excellent elongation. The Ni-plated steel foil for hydrogen secondary battery current collectors comprises, by mass %, C: 0.0001 to 0.0200%, Si: 0.0001 to 0.0200%, Mn: 0.005 to 0.300%, P: 0.001 to 0.020%, S: 0.0001 to 0.0100%, Al: 0.0005 to 0.1000%, N: 0.0001 to 0.0040%, one or both of Ti and Nb: 0.800% or less respectively, and a balance of Fe and impurities. The Ni-plated steel foil has an Ni plating layer on both surfaces. The thickness of the Ni plating layer on both surfaces of the Ni-plated steel foil is greater than or equal to 0.15 μm, the thickness of the Ni-plated steel foil is 5 to 50 μm, the tensile strength is over 400 MPa but no greater than 1200 MPa, and the surface defect area percentage is less than or equal to 5.00% for both surfaces of the Ni-plated steel foil.

15 Claims, No Drawings

NI-PLATED STEEL FOIL FOR NICKEL-HYDROGEN SECONDARY BATTERY CURRENT COLLECTOR, NICKEL-HYDROGEN SECONDARY BATTERY CURRENT COLLECTOR, AND NICKEL-HYDROGEN SECONDARY BATTERY

FIELD

The present invention relates to an Ni-plated steel foil for nickel-hydrogen secondary battery current collectors, a current collector for nickel-hydrogen secondary batteries, and a nickel-hydrogen secondary battery.

BACKGROUND

Along with the rapid proliferation of personal computers, portable phones, and other electronic devices in recent years, high capacity chargeable and dischargeable batteries such as nickel-hydrogen secondary batteries, lithium ion secondary batteries, and lithium polymer secondary batteries have been used. In particular, nickel-hydrogen secondary batteries are used as power sources for mobile device communication and portable information terminals due to their high energy density. In addition, while energy density and output characteristics are moderate, nickel-hydrogen secondary batteries are advantageous in terms of reliability, safety, and cost and have been put into practical use as in-vehicle batteries in recent years. The market for such batteries has seen rapid growth. Along with this, in the further pursuit of size and weight reduction, there has been demand for performance improvements for achieving greater size and weight reduction for batteries that occupy a large amount of the volume inside a device.

The basic structure of such a secondary battery is constituted by electrodes comprising foil-shaped metal current collectors coated with a substance that can reversibly produce a chemical reaction, that is, a so-called active material, separators which separate the positive electrode and negative electrode, an electrolyte, and a battery case. A nickel-hydrogen secondary battery generally uses nickel foam as the current collectors or core, but nickel foam is expensive since the porous body is formed through a complicated production process. Further, current collectors or the core itself does not directly contribute to battery capacity. As such, the use of cheap and thin metal foil as current collectors has begun to be studied to meet recent demands for increasing capacity.

As examples of the above-mentioned foil-shaped metal current collectors, iron-based foils have been proposed in the past. Although iron has a higher electrical resistance than copper, in recent years, electrical resistance has become less of an issue due to the diversification of battery applications and required characteristics, along with the recent innovations in battery construction.

Regarding arrangements in which iron foil is used as a negative electrode current collector, PTL 1 proposes using an electrolytic iron foil with a thickness of 35 μm or less as the current collector of a negative electrode of a lithium secondary battery. Further, the use of Ni-plated electrolytic iron foils has also been proposed from the viewpoint of rust prevention.

In PLT 2, it is proposed that a metallic foil consisting of iron sesquioxide formed on the surface of an iron foil or Ni plated iron foil is used as the negative electrode current collector of a nonaqueous electrolyte secondary battery such as a lithium secondary battery. However, this iron-based metal foil cannot avoid Fe being leached out at the time of over discharge, is susceptible to side reactions at negative potentials, and is liable to hinder battery efficiency and life as a result.

PTLs 3 and 4 each propose a steel foil which can be used as the negative electrode current collector of a non-aqueous electrolyte secondary battery such as a lithium-ion secondary battery. Each of these steel foils is described as being a high-strength steel foil for negative electrode current collectors which is thin, strong, light weight, and economical and has excellent rust resistance, resistance to metal ion leaching at the time of over discharge, and stability at negative potentials.

As described in the above PTLs, steel foils are thin, strong, light weight, and economical and are rust resistant, resistant to metal ion leaching at the time of over discharge, and stabile at negative potentials and are understood to be excellent for use as a negative electrode current collector of a lithium-ion secondary battery. However, the iron foils and steel foils proposed in these PTLs are all meant for use in a lithium-ion secondary battery and not for the current collector of a nickel-hydrogen secondary battery.

Because the steel foils described in PTLs 3 and 4 are thin and strong and have excellent rust resistance, resistance to metal ion leaching at the time of over discharge, and stability at negative potentials, the use of these steel foils as the current collectors of nickel-hydrogen secondary batteries has been pondered. However, it has been found that if either of the steel foils described in PTLs 3 and 4 is used as the current collector of a nickel-hydrogen secondary battery, only a capacity far lower than the theoretical capacity (Ah/kg) of a nickel-hydrogen secondary battery can be achieved. It is thought that this is because the electrolyte in a lithium-ion secondary battery and the electrolyte in a nickel-hydrogen secondary battery are different. Due to the properties of lithium batteries, a non-aqueous electrolyte is used as the electrolyte in a lithium-ion secondary battery. On the other hand, an alkaline aqueous solution is normally used in a nickel-hydrogen secondary battery. For this reason, it is thought that the leaching of metal ions from the current collector in the alkaline solution environment, which had not been a problem in steel foils for lithium-ion secondary battery current collectors, is related to the reduction in the battery capacity of the nickel-hydrogen secondary battery.

CITATION LIST

Patent Literature

[PTL 1] Japanese Unexamined Patent Publication No. 06-310126
[PTL 2] Japanese Unexamined Patent Publication No. 06-310147
[PTL 3] Japanese Unexamined Patent Publication No. 2013-222696
[PTL 4] Japanese Patent No. 6124801

SUMMARY

Technical Problem

An object of the present invention is based on the use of a light weight and economical steel foil to provide a high-strength steel foil for nickel-hydrogen secondary battery current collectors which is thin and strong, and has excellent rust resistance and resistance to metal ion leaching, which realizes a high-capacity nickel-hydrogen secondary battery, to provide a nickel-hydrogen secondary battery current collector provided with the Ni-plated steel foil, and to provide a nickel-hydrogen secondary battery provided with the Ni-plated steel foil.

Solution to Problem

The inventors discovered that the reduction in capacity of the nickel-hydrogen secondary battery is caused by the metal components, in particular, the Fe component, of the steel foil used in the current collector being leached out into the electrolyte and oxidized on the positive electrode and completed the present invention by using steel foil provided with an Ni plating layer from which leaching of the Fe component is suppressed as the positive and negative electrode current collectors of the nickel-hydrogen secondary battery. Further, based on these findings, it was found that by preparing such a steel foil provided with an Ni plating layer for suppressing leaching of the Fe component and applying heat treatment to the steel foil under specific conditions after cold rolling, it is possible to obtain a high-strength steel foil for nickel-hydrogen secondary battery current collectors which retains Fe leaching prevention performance while having excellent strength and breaking elongation.

The gist of the present invention for achieving the above object is as follows.

(1) An Ni-plated steel foil for nickel-hydrogen secondary battery current collectors comprising, by mass %,
C: 0.0001 to 0.0200%,
Si: 0.0001 to 0.0200%,
Mn: 0.005 to 0.300%,
P: 0.001 to 0.020%,
S: 0.0001 to 0.0100%,
Al: 0.0005 to 0.1000%,
N: 0.0001 to 0.0040%,
one or both of Ti and Nb: 0.800% or less respectively, and
a balance of Fe and impurities, and
having an Ni plating layer on both surfaces,
wherein, an Ni plating layer thickness of each of a first surface and second surface of the Ni-plated steel foil is greater than or equal to 0.15 μm,
a thickness of the Ni-plated steel foil is 5 to 50 μm,
a tensile strength is over 400 MPa but no greater than 1200 MPa, and
a surface defect area percentage is less than or equal to 5.00% for each of the first surface and second surface of the Ni-plated steel foil.
(2) The Ni-plated steel foil for nickel-hydrogen secondary battery current collectors according to (1) having a breaking elongation of greater than or equal to 3%.
(3) The Ni-plated steel foil for nickel-hydrogen secondary battery current collectors according to (1) or (2) wherein the thickness of the Ni-plated steel foil is 10 to 30 μm.
(4) The Ni-plated steel foil for nickel-hydrogen secondary battery current collectors according to any one of (1) to (3) wherein the thickness of the Ni plating layer on the first surface and second surface of the Ni-plated steel foil is 0.20 to 1.50 μm.
(5) A nickel-hydrogen secondary battery current collector comprising the Ni-plated steel foil for nickel-hydrogen secondary battery current collectors according to any one of (1) to (4).
(6) A nickel-hydrogen secondary battery comprising a positive electrode current collector on which a positive electrode active material layer, a separator, a negative electrode active material layer, and a negative electrode current collector are sequentially laid, in which nickel-hydrogen secondary battery, at least one of the positive electrode current collector and the negative electrode current collector is the nickel-hydrogen secondary battery current collector according to (5).

Advantageous Effects of Invention

According to the present invention, it is possible to provide a nickel-hydrogen secondary battery current collector and nickel-hydrogen secondary battery which are thin and strong, less susceptible to Fe component leaching, which is a cause of reduced battery capacity, and light and economical. The Ni-plated steel foil for nickel-hydrogen secondary battery current collectors of the present invention can be favorably used as positive and negative electrode current collectors of a nickel-hydrogen secondary battery. Additionally, it is possible to obtain an Ni-plated steel foil for nickel-hydrogen secondary battery current collectors which has excellent elongation.

DESCRIPTION OF EMBODIMENTS

The Ni-plated steel foil for nickel-hydrogen secondary battery current collectors of the present invention (below, simply referred to as "Ni-plated steel foil" at times) comprises the following steel chemical composition (% is mass %) and is characterized in that the thickness of the Ni plating layer on both surfaces (first surface and second surface) of the Ni-plated steel foil is greater than or equal to 0.15 μm, the thickness of the Ni-plated steel foil is 5 to 50 μm, the tensile strength is greater than 400 MPa but no greater than 1200 MPa, and the surface defect area percentage is less than or equal to 5.00% for each of the first surface and the second surface of the Ni-plated steel foil.

The Ni-plated steel foil of the present invention is particularly characterized in that the surface defect area percentage is less than or equal to 5.00% for each of the first surface and the second surface of the Ni-plated steel foil. As mentioned above, if a steel foil for lithium-ion secondary battery current collectors is used as the current collector of a nickel-hydrogen secondary battery, the battery capacity will be reduced due to metal ions of the current collector components being leached out—which had not particularly been a problem at times other than over discharge.

The inventors discovered as a result of their research that this reduction in battery capacity is caused by the metal components of the steel foil, in particular, the Fe component, being leached out into the alkaline solution due to surface defects on the Ni-plated steel foil.

Ni-plated steel foil surface defects include defects such as Ni plating layer cracks, blemishes, and peeling introduced when an Ni-plated steel sheet (thin sheet) is being rolled into an Ni-plated steel foil due to contact with rolling mill rolls or deforming of the material being rolled. It was found that the Fe of the metal components of the steel foil leaches out from these defective parts of the Ni plating layer into the electrolyte alkaline solution whereby the battery capacity of the nickel-hydrogen secondary battery ends up rapidly dropping.

The inventors discovered that by controlling the foil rolling process when rolling an Ni-plated steel sheet (thin sheet) into Ni-plated steel foil, it is possible to dramatically mitigate Ni plating layer defects. The surface defect area percentage of the Ni-plated steel foil of the present invention is less than or equal to 5.00% for each of the first surface and the second surface. Should the surface defect area percentage be over 5.00%, the leached amount of Fe ions will be large and only a battery capacity of less than or equal to half of that of the theoretical capacity can be achieved. Since it is preferable that there be no defects on the surface of the Ni-plated steel foil, the lower limit of the defect area percentage of the Ni-plated steel foil is 0%.

Surface defects on a nickel-plated steel sheet are generally evaluated through a ferroxyl test. The surface defect area percentage of the Ni-plated steel foil defined in the present invention is calculated from photographs of the surface defects on the first surface and the second surface of a test piece obtained based on the following testing method.

As the specific procedure, first, a ferroxyl test solution is prepared by dissolving 10 g/L of sodium ferrocyanide (potassium hexacyanoferrate(II) trihydrate), 10 g/L of potassium ferricyanide (potassium hexacyanoferrate(III) trihydrate), and 5 g/L of sodium chloride in pure water. A 50 square mm Ni-plated steel foil test piece having Ni plating layers on the first surface and second surface is immersed in this test solution for three minutes. This test piece is taken out of the test solution, washed with water, and dried for five minutes at 65° C. Photographs are taken of the first surface and second surface of a test piece on which blue spots have appeared. These photographs are uploaded into a computer and binarized using image analysis software in order to provide numerical values for the defect area percentages for the first surface and second surface. As one example, a method for identifying the above blue spots using an ImageJ (image analysis software) function for binarization using two thresholds will be described. First, the photographs uploaded into the computer are converted to 8-bit grayscale. Note that in grayscale images saved in 8 bits, a brightness of 0 represents black and a brightness of the maximum value 255 represents white. It is found that it is possible to accurately identify blue spots by setting the brightness thresholds to 0 and 215. Next, the images are processed so that the areas with brightnesses between 0 and 215 change color so as to differentiate the blue spots. Afterwards, an analysis function is used to calculate the area percentage taken up by the blue spot sections. Note that the binarization may use image analysis software other than ImageJ.

The components of the Ni-plated steel foil of the present invention include C: 0.0001 to 0.0200%, Si: 0.0001 to 0.0200%, Mn: 0.005 to 0.300%, P: 0.001 to 0.020%, S: 0.0001 to 0.0100%, Al: 0.0005 to 0.1000%, N: 0.0001 to 0.0040%, one or both of Ti and Nb: 0.800% or less respectively, and a balance of Fe and impurities.

First, the reasons for the limitations of the chemical composition will be explained. Note that in the description, numerical ranges expressed with "to" mean ranges where the numerical values before and after the "to" are the lower limit value and the upper limit value. For numerical values indicated with "less than" and "over", those values are not included in the numerical range. The % of the component means mass %.

C: 0.0001 to 0.0200%

C is an element increasing the strength of steel. Work hardening occurs readily with an increase in the C content. If the deformation resistance at the time of cold rolling increases with an increase in the C content, it will become necessary for high pressure to be applied by the rolling mill rolls, therefore Ni plating layer defects introduced when an Ni-plated steel sheet (thin sheet) is rolled into an Ni-plated steel foil will increase. Further, the electrical resistance of the steel may deteriorate if C is excessively contained, therefore the upper limit of the C content is 0.0200%. The lower limit of the C content is not particularly defined, but since the limit in current refining techniques is about 0.0001%, this is made the lower limit. The C content is more preferably 0.0010% to 0.0100%.

Si: 0.0001 to 0.0200%

Si is an element that increases the strength of steel. However, the electrical resistance of steel may deteriorate if excessively contained, therefore the upper limit of the Si content is 0.0200%. If the Si content is less than 0.0001%, the cost of refining will be enormous, therefore the lower limit of the Si content is 0.0001%. The Si content is more preferably 0.0010% to Mn: 0.005 to 0.300%

Mn is an element that increases the strength of steel. However, the electrical resistance of steel may deteriorate if excessively contained, therefore the upper limit of the Mn content is 0.300%. If the Mn content is less than 0.005%, the cost of refining will be enormous and rollability may decrease due to the steel becoming overly softened; therefore the lower limit of the Mn content is 0.005%. The Mn content is more preferably 0.050 to 0.200%.

P: 0.001 to 0.020%

P is an element that increases the strength of steel. However, the electrical resistance of steel may deteriorate if excessively contained, therefore the upper limit of the P content is 0.020%. If the P content is less than 0.001%, the cost of refining may become enormous, therefore the lower limit of the P content is 0.001%. The P content is more preferably 0.001 to 0.010%.

S: 0.0001 to 0.0100%

S is an element that reduces the hot workability and corrosion resistance of steel, therefore the less the content, the more preferable. Further, in thin steel foils like the steel foil according to the present invention, if there is a large amount of S, the electrical resistance may deteriorate or the strength of the steel may decrease due to inclusions arising from the presence of S. Therefore, the upper limit of the S content is 0.0100%. If the S content is less than 0.0001%, the cost of refining may become enormous, therefore the lower limit of the S content is 0.0001%. The S content is more preferably 0.0010 to 0.0080%.

Al: 0.0005 to 0.1000%

Al is included in an amount of 0.0005% or greater as a steel deoxidizing element. However, an excessive amount may lead to the electrical resistance of steel deteriorating and to an increase in production costs, therefore the upper limit of the Al content is 0.1000%. The Al content is more preferably 0.0100 to 0.0500%.

N: 0.0001 to 0.0040%

N is an element that reduces the hot workability and corrosion resistance of steel, therefore the less the content, the more preferable. Therefore, the upper limit of the N content is 0.0040%. If the N content is less than 0.0001%, the cost of refining may become enormous, therefore the lower limit of the N content is 0.0001%. The N content is more preferably 0.0010 to 0.0030%.

One or Both of Ti and Nb: 0.800% or Less Respectively

The steel foil of the Ni-plated steel foil of the present invention further contains 0.800% or less of Ti and/or Nb. Ti and/or Nb can improve the workability of steel by pinning the C and N in the steel in the form of carbides and nitrides. However, excessive addition may lead to an increase in production costs and deterioration in electrical resistance. Preferable ranges of inclusion are Ti: 0.010 to 0.800% and Nb: 0.005 to 0.050%. More preferable ranges of inclusion are Ti: 0.010 to 0.100% and Nb: 0.005 to 0.040%.

Impurities

The term "impurities" used in the description means impurity elements derived from the raw materials and elements that are inadvertently mixed in or intentionally added during production of an Ni-plated steel sheet but do not impede the properties of the present invention. In the steel foil of the present invention, inadvertent mixing in of impurities is permitted to the extent that they do not impede the properties of the present invention.

Further, the steel foil according to the present invention may additionally contain, in place of a portion of the Fe, elements such as B, Cu, Ni, Sn, and Cr to the extent that the properties of the steel foil according to the present embodiment are not compromised.

The above components of the Ni-plated steel foil are measured using a general analysis method. The location where the components are measured is at a center section of the steel foil. Here, a center section is any location excluding portions of the Ni-plated steel foil that are 1 cm from the end sections. The components are measured using ICP-AES (Inductively Coupled Plasma-Atomic Emission Spectroscopy). Note that C and S are measured using an infrared absorption method after combustion, and N is measured using an inert gas fusion thermal conductivity method. The Ni plating layers on the surface are mechanically ground off, then analysis of the chemical components is performed.

The Ni-plated steel foil of the present invention has Ni plating layers on the first surface and the second surface of the steel foil. The "first surface" refers to one surface of the Ni-plated steel foil, and the "second surface" refers to the other surface of the Ni-plated steel foil. The thickness of the Ni plating layer deposited on each of the first surface and second surface on the steel foil is greater than or equal to 0.15 μm. While there is an improvement in rust resistance and leaching of metals from the steel foil the greater the thicknesses of the Ni plating layers, there is a cost increase. Since a prominent performance improvement is not found even if the thickness of the Ni plating layer on each surface is over 2.00 μm, the practical upper limit of the thickness of the Ni plating layer from the viewpoint of cost effectiveness is 2.00 μm. A more preferable thickness for the Ni plating layer is 0.20 to 1.50 μm.

Ni is plated on the first surface and second surface of the steel sheet prior to foil rolling (pre-rolling plating). The Ni-plated steel sheet is annealed to form an Fe—Ni diffusion layer (also referred to as an "Fe—Ni alloy layer"), then is rolled into a foil. Care needs to be taken when rolling a steel sheet having Ni plating layers into a foil. For example, if the elongation of the Ni plating layers from foil rolling is less than the elongation of the steel sheet, defects such as cracks may occur on the Ni plating layers and reduce the strength of the foil.

Soft Ni plating is particularly favorable as Ni plating that does not reduce foil strength. Specifically, a pure Ni plating deposited on a steel sheet and containing nothing else other than impurities is subjected to heat treatment at 300° C. or greater. This results in the strain of the plating layer being released. This Ni plating is used as the soft Ni plating of the Ni-plated steel foil of the present invention. Further, Ni may be additionally plated after foil rolling to repair Ni plating layer defects introduced during foil rolling.

Note that the plating thickness of the Ni-plated steel sheet is measured based on the testing method prescribed in JIS H8501-1999. That is, while the plating thickness is controlled by the plating current value in production, the deposited amount (g/m$^2$) of the Ni plating is directly measured using chemical analysis such as ICP after Ni is plated on the first surface and second surface of the steel sheet prior to foil rolling (pre-rolling plating) and before the Ni-plated steel sheet is annealed. A calibration curve is prepared in advance per Ni plating basis weight, and the Ni plating thickness is calculated from the X-ray fluorescence intensity of the Ni. However, the detected intensity of internally diffused Ni will be low after the Ni-plated steel sheet is annealed, therefore X-ray fluorescence intensity will be detected as being low even for the same basis weight. For this reason, it is necessary to newly prepare a calibration curve for post-annealing of the Ni-plated steel sheet.

Further, the plating thickness of the Ni-plated steel foil is measured using glow discharge spectroscopy (GDS). Specifically, in a profile of Ni atoms in the depth direction measured by GDS, the depth at which the content ratio of Ni atoms is half the maximum is treated as the Ni plating thickness. The region in which the content of the Fe atoms measured by GDS is 90 mass % or greater is treated as the steel foil. Further, the regions existing between the Ni plating layers and the steel foil are treated as Fe—Ni alloy layers. Here, the thickness obtained by conversion to the product of the sputtering time and sputtering speed for a silicon single crystal is used as a depth reference. Note that the maximum value of the Ni content of the Ni plating layers of the Ni-plated steel foil is 90 mass % or greater. This maximum Ni content is obtained by measuring the content of each element by GDS. In the present invention, the maximum Ni content is measured by glow discharge spectroscopy.

The thickness of the Ni-plated steel foil of the present invention including the Ni plating layers is 5 to 50 μm. This is because in order to reduce the size and weight of a battery using an Ni-plated steel foil having sufficiently high mechanical strength like that in the present invention, thin current collectors, that is, thin steel foils, are desired. From the viewpoint of size and weight reduction, the steel foil is preferably as thin as possible. It is not necessary to particularly limit the lower limit. However, considering costs or thickness uniformity, 5 μm or greater is appropriate. The thickness of the Ni-plated steel foil is preferably 5 to 40 μm, more preferably 10 to 30 μm.

The tensile strength of the Ni-plated steel foil of the present invention is over 400 MPa but no greater than 1200 MPa. Note that the tensile strength is the measured value at ordinary temperature. A tensile strength less than or equal to 400 MPa could possibly result in wrinkles and folds caused by handling when coating an active material layer on the current collector and deforming of the steel foil or detaching of the active material caused by expanding and contracting of the active material accompanying charging and discharging. Note that the tensile strength of the steel foil is measured based on a testing method based on the metal material tensile testing method prescribed in JIS Z2241. The shape of the test piece is 13B, and the tension direction is the rolling direction. The testing speed is 1 mm/min. The preferable lower limit of the tensile strength is 600 MPa.

It is not necessary to particularly limit the upper limit of the tensile strength from the viewpoint of preventing wrinkles and folds on the steel foil and deformation and detaching of the active material. However, considering handling and stability for acquiring strength through work hardening by industrial rolling, 1200 MPa is the practical upper limit of the tensile strength of the steel foil. The preferable upper limit of the tensile strength is 1000 MPa.

By subjecting the Ni-plated steel foil of the present invention to heat treatment after cold rolling, it is possible to impart elongation. The elongation of the Ni-plated steel foil after heat treatment is preferably 3% or greater. It is more preferably 4% or greater, even more preferably 5% or greater. If the breaking elongation is 3% or greater, ripping of the Ni-plated steel foil when being wound can be sufficiently prevented. Note that "elongation" means breaking elongation. The elongation is measured based on a testing method based on the metal material tensile testing method prescribed in JIS Z2241-2011. The shape of the test piece is 13B, and the tension direction is the rolling direction. The testing speed is 1 mm/min.

The method for producing the Ni-plated steel foil of the present invention is as follows. First, in accordance with an ordinary thin sheet production method, a thin sheet (steel sheet) having the above predetermined chemical composition is produced. Afterwards, Ni is plated on the first surface and the second surface of the steel sheet before foil rolling. This Ni-plated steel sheet is annealed to form Fe—Ni diffusion layers (also referred to as Fe—Ni alloy layers), then is cold rolled (foil rolling) into a 5 to 40 μm thick Ni-plated steel foil. Using the work hardening occurring due to cold rolling, an Ni-plated steel foil with a high strength of over 600 MPa but no greater than 1200 MPa is produced.

The cumulative reduction rate from foil rolling is 70% or greater. Here, the cumulative reduction rate is the percentage of the cumulative reduction amount (the difference between the entrance sheet thickness before the first pass and the exit sheet thickness after the final pass) to the entrance sheet thickness at the first rolling stand. If the cumulative reduction rate is less than 70%, a sufficient foil strength will not be manifested. The cumulative reduction rate from foil rolling is preferably 80% or greater. The upper limit of the cumulative reduction rate is not particularly limited. However, with a normal rolling capacity, about 98% is the limit of the achievable cumulative reduction rate. Further, in order to mitigate plating defects caused by rolling in each pass, the reduction rate in each pass of rolling is preferably in the range of 5 to 40%.

Further, the unit rolling load (kN/mm) in each pass is controlled to a suitable range. The unit rolling load is the load applied on the material to be worked from the rolling mill rolls divided by the sheet width of the material. A preferable unit rolling load is 0.5 to 1.2 kN/mm. If less than 0.5 kN/mm, there is little heat generated from rolling and the softness of the Ni plating layers will decrease, therefore cracks will form on the Ni plating layers, increasing the surface defect area percentage. Further, if over 1.2 kN/mm, too much heat will be generated, causing the Ni plating layers to be picked up by the rolling mill rolls (the Ni sticking to the rolling mill rolls), increasing the surface defect area percentage.

Further, the Ni-plated steel foil after cold rolling produced in the above manner can be subjected to heat treatment. The heat treatment is performed under conditions of a temperature range of 700 to 850° C. for 3 to 30 seconds. By performing heat treatment, it is possible to make the elongation 3% or greater. Note that "elongation" means breaking elongation. The elongation is measured based on a testing method based on the metal material tensile testing method prescribed in JIS Z2241-2011. The shape of the test piece is 13B, and the tension direction is the rolling direction. The testing speed is 1 mm/min.

If the temperature of the heat treatment is less than 700° C., recrystallization of the Ni-plated steel foil will not sufficiently progress and the elongation will not be 3% or greater. For this reason, the temperature of the heat treatment is 700° C. or greater. If the temperature of the heat treatment is over 850° C., the Ni in the Ni plating layers will diffuse into the steel foil, making the surface defect percentage over 5%. For this reason, the temperature of the heat treatment is less than or equal to 850° C.

If the treatment time of the heat treatment is less than 3 seconds, recrystallization of the Ni-plated steel foil will not sufficiently progress and the elongation will not become 3% or greater. For this reason, the treatment time of the heat treatment is 3 seconds or greater. If the treatment time of the heat treatment is over 30 seconds, the Ni in the Ni plating layers will diffuse into the steel foil, making the surface defect percentage over 5%. For this reason, the treatment time of the heat treatment is less than or equal to 30 seconds.

By using the Ni-plated steel foil of the present invention as the positive electrode current collector or negative electrode current collector of a nickel-hydrogen secondary battery, it is possible to obtain a nickel-hydrogen battery which is less susceptible to reduced battery capacity, that is, has a longer battery life. Specifically, a general nickel-hydrogen secondary battery comprises a positive electrode current collector on which a positive electrode active material layer, separator, negative electrode active material layer, and negative electrode current collector are sequentially laid. A nickel-hydrogen secondary battery current collector comprising the Ni-plated steel foil according to the present invention is used for at least one of the above positive electrode current collector and above negative electrode current collector. The nickel-hydrogen secondary battery current collector according to the present invention may use the Ni-plated steel foil as is and may be subjected to surface working to improve the area of contact with the active material layer. The Ni-plated steel foil can be favorably used as a positive electrode current collector and a negative electrode current collector, but it can be particularly favorably used as a positive electrode current collector from the viewpoint of excellent metal ion leaching resistance.

In the nickel-hydrogen battery according to the present invention, known members can be used for the constituent members other than the Ni-plated steel foil according the present invention. As the positive electrode current collector and the negative electrode current collector other than the Ni-plated steel foil, for example, nickel foil may be mentioned. As the active material used in the positive electrode active material layer, for example, nickel hydroxide may be mentioned. As the active material used in the negative electrode active material layer, for example, hydrogen storage alloys may be mentioned. As the separator, for example, polyolefin non-woven fabric and polyamide non-woven fabric may be mentioned. Besides these constituent members, known outer casings, current collector leads, electrolytes, conductive aids, and binders can be used as constituent members.

EXAMPLES

Next, examples of the present invention will be explained. The conditions of the examples are just illustrations of conditions used for confirming the workability and effects of the present invention. The present invention is not limited to these illustrations of conditions. The present invention can use a variety of conditions as long as the object of the present invention is achieved without departing from the gist of the present invention.

Preparation of Ni-Plated Steel Foils for Testing

Slabs A and B having the following components are produced. The balance is steel and impurities, and the unit is mass %.

TABLE 1

| Slab | C | Si | Mn | P | S | Al | N | Ti | Nb |
|---|---|---|---|---|---|---|---|---|---|
| A | 0.0020 | 0.0100 | 0.090 | 0.005 | 0.0060 | 0.0330 | 0.0024 | 0.037 | — |
| B | 0.0043 | 0.0130 | 0.170 | 0.012 | 0.0050 | 0.0340 | 0.0023 | — | 0.023 |

(unit: mass %)

Example 1

Thin sheets having a sheet thickness of 0.15 mm were obtained from the Slabs A and B having the chemical compositions shown in Table 1 by performing hot rolling and cold rolling by a normal thin sheet production method.
Ni Plating Operation In the nickel plating, nickel plating layers of 3.9 to 8.5 µm, depending on the pass speed, were formed on both surfaces (first surface and second surface) of each steel sheet using a plating bath containing nickel sulfate: 320 g/L, nickel chloride: 70 g/L, and boric acid: 40 g/L under the conditions of a bath temperature: 65° C. and electrolytic current: 20 A/dm$^2$. Next, continuous annealing was performed at a holding temperature of 820° C. and for a holding time of 40 seconds in a 5% H$_2$ (balance N$_2$) atmosphere.
Foil Rolling Operation As indicated in Table 2, the minimum/maximum unit rolling load (kN/mm) of each pass was set to perform a foil rolling operation. By the above operation, Steel Foil Nos. 2 to 10 were obtained.
Measurement of Thicknesses of Ni-Plated Steel Foils The thicknesses of the obtained Ni-plated steel foils were measured with an electrical micrometer.
Measurement of Plating Thicknesses The plating thicknesses of the obtained steel foils were measured using glow discharge spectroscopy. The results are shown in Table 2.
Measurement of Tensile Strengths The tensile strengths of the obtained Ni-plated steel foils were measured based on a testing method based on the metal material tensile testing method prescribed in JIS Z2241-2011.
Measurement of Surface Defect Area Percentages The plated steel foil surface defect area percentages of Steel Foil Nos. 2 to 10 were measured based on the above-mentioned testing method using potassium ferricyanide. Photographs were taken of the first surfaces and second surfaces of the obtained test pieces, and these photographs were binarized using the ImageJ image analysis software in order to obtain numerical values for the defect area percentages for the first surfaces and second surfaces. Afterwards, the area percentages of the blue spot sections were calculated using an analysis function. The results are shown in Table 2.
Constant Potential Test in Alkali To evaluate metal ion leaching resistance, a constant potential test was performed on Steel Foil Nos. 2 to 10 to measure the constant potential current values (µA/cm$^2$) after 24 hours in alkali. An Ni wire was spot welded on one end of a sample with an immersed size of about 50 square mm, the connecting section was protected by a 0.05 mm thick circuit tape of Product No. 647 made by Teraoka Seisakusho, then the sample was immersed in a 6N (normality) KOH test liquid filled in a Teflon™ container with a cap. The testing temperature was 65° C., and a potential was applied at +0.4 V vs. SHE under the conditions of a counter electrode: Pt and reference electrode: alkaline/mercury electrode (RE-61AP made by BAS). Using potentiostat HA-151B made by Hokuto Denko, the change in current 24 hours after voltage application was measured. A passing evaluation was given if the constant potential current value after 24 hours was less than or equal to 4 µA/cm$^2$ and a failing evaluation if otherwise. The results are shown in Table 2.

As a reference for evaluating the constant potential current value after 24 hours in alkali, pure Ni foil (foil thickness 200 µm) was prepared as Steel Foil No. 1 (Comparative Example 1). As shown in Table 2, by controlling the unit rolling load in each pass of rolling for the invention examples of Steel Foil Nos. 3 to 5 and 7 to 9 so as to be in a suitable range, the surface defect area percentage of the Ni plating layer becomes less than or equal to 5.00% for both the first surface and the second surface. In the invention example of Steel Foil No. 8, it was possible to improve the constant potential current value after 24 hours in alkali to an equivalent level to that of pure Ni foil (Steel Foil No. 1, Comparative Example 1). On the other hand, the unit rolling load in each pass of rolling for the comparative examples of Steel Foil Nos. 2, 6, and 10 is outside the suitable range, so although the thickness of the Ni plating layer is within the range of the present invention, the surface defect area percentage of the Ni plating layer becomes large and the constant potential current value after 24 hours in alkali greatly deteriorates.

Example 2

In Example 2, cold rolled Ni-plated steel foils were subjected to heat treatment. Elongations of 3% or greater were confirmed.
Preparation of Ni-Plated Steel Foils for Testing Thin sheets having a sheet thickness of 0.15 mm are obtained from the Slabs A and B produced in Example 1 by performing hot rolling and cold rolling by the same thin sheet production method as in Example 1.
Ni Plating Operation In the nickel plating, nickel plating layers of 3.9 to 8.5 µm, differing by changing the pass speed, were formed on both surfaces of each steel sheet using the same plating bath and under the same conditions as in Example 1. Next, continuous annealing was performed at a holding temperature of 820° C. and for a holding time of 40 seconds in a 5% H$_2$ (balance N$_2$) atmosphere.
Foil Rolling Operation As indicated in Table 2, the minimum/maximum unit rolling load (kN/mm) of each pass was set to perform a foil rolling operation. By the above operation, Steel Foil Nos. 11 to 20 were obtained.
Heat Treatment Operation After the foil rolling operation, heat treatment was performed under the heat treatment conditions shown in Table 2. Note that "-" in the heat treatment temperature and heat treatment time columns in Table 2 indicate that heat treatment was not performed.

Measurement of Thicknesses of Ni-Plated Steel Foils

The thicknesses of the obtained Ni-plated steel foils were measured with an electrical micrometer like in Example 1. The results are shown in Table 2.

Measurement of Plating Thicknesses

The plating thicknesses of the obtained steel foils were measured using glow discharge spectroscopy like in Example 1. A passing evaluation was given if the thickness of the Ni plating layer was 0.15 μm or greater and a failing evaluation if otherwise. The results are shown in Table 2.

Measurement of Tensile Strengths and Elongation

The tensile strengths and the elongations at break of the obtained Ni-plated steel foils were measured in the same way as Example 1, based on a testing method based on the metal material tensile testing method prescribed in JIS Z2241-2011. A passing evaluation was given if the breaking elongation was 3% or greater and a failing evaluation if otherwise. The results are shown in Table 2.

Measurement of Surface Defect Area Percentages

The plated steel foil surface defect area percentages of Steel Foil Nos. 11 to 20 were measured in the same way as Example 1 based on the above-mentioned testing method using potassium ferricyanide. Photographs were taken of the first surfaces and second surfaces of the obtained test pieces, and these photographs were binarized using the ImageJ image analysis software in the same way as Example 1 in order to obtain numerical values for the defect area percentages for the first surfaces and second surfaces. Afterwards, the area percentages of the blue spot sections were calculated using an analysis function. The results are shown in Table 2.

Constant Potential Test in Alkali

To evaluate metal ion leaching resistance, a constant potential test was performed on Steel Foil Nos. 11 to 20 in the same way as Example 1 to measure the constant potential current values (μA/cm$^2$) after 24 hours in alkali. A passing evaluation was given if the constant potential current value after 24 hours was less than or equal to 4 μA/cm$^2$ and a failing evaluation if otherwise. The results are shown in Table 2.

As shown in Table 2, by suitably controlling the unit rolling load in each pass of rolling and the heat treatment conditions for Steel Foil Nos. 13 to 15, 17, and 18, the surface defect area percentage of the Ni plating layer becomes less than or equal to 5.00% for both the first surface and the second surface and the elongation becomes 3% or greater. In Steel Foil Nos. 11, 12, and 19, there was no heat treatment process or the heat treatment conditions were outside from the suitable range, so the elongations were low, but the thicknesses of the Ni plating layers and the surface defect area percentages were within the range of the present invention. Further, in Steel Foil No. 16, the heat treatment temperature was too high, so the surface defect area percentage of the Ni plating layer became large and the constant potential current value after 24 hours in alkali greatly deteriorated. In Steel Foil No. 20, the pressure applied in rolling was too high, so the surface defect area percentage of the Ni plating layer became large and the constant potential current value after 24 hours in alkali greatly deteriorated.

TABLE 2

| Steel Foil No. | | Material | Slab | Foil thickness (μm) | Minimum/ maximum unit rolling load of each pass (kN/mm) | Heat treatment temperature (° C.) | Heat treatment time (sec.) | Plating thickness (μm) | | Tensile strength (MPa) | Elongation (%) | Surface defect area percentage | | Constant potential current value after 24 hours in alkali (μA/cm$^2$) |
|---|---|---|---|---|---|---|---|---|---|---|---|---|---|---|
| | | | | | | | | First surface | Second surface | | | First surface | Second surface | |
| 1 | Comparative example | Pure Ni | — | 200 | — | — | — | — | — | — | — | — | — | 0.6 |
| 2 | Comparative example | Ni-plated steel foil | A | 8 | 0.7/1.5 | — | — | 0.20 | 0.20 | 825 | 0.5 | 6.20 | 4.50 | 7.7 |
| 3 | Invention example | Ni-plated steel foil | A | 10 | 0.8/1.2 | — | — | 0.48 | 0.48 | 833 | 0.5 | 1.40 | 2.30 | 3.3 |
| 4 | Invention example | Ni-plated steel foil | B | 10 | 0.5/1.2 | — | — | 0.25 | 0.25 | 886 | 0.7 | 1.50 | 1.30 | 2.0 |
| 5 | Invention example | Ni-plated steel foil | A | 15 | 0.6/1.1 | — | — | 0.38 | 0.38 | 804 | 0.6 | 0.30 | 2.10 | 2.3 |
| 6 | Comparative example | Ni-plated steel foil | A | 15 | 0.4/0.9 | — | — | 0.76 | 0.76 | 804 | 0.7 | 7.30 | 4.30 | 8.5 |
| 7 | Invention example | Ni-plated steel foil | A | 20 | 0.5/1.2 | — | — | 0.96 | 0.96 | 785 | 0.7 | 0.30 | 0.10 | 0.9 |
| 8 | Invention example | Ni-plated steel foil | A | 20 | 0.7/1.1 | — | — | 0.51 | 0.51 | 785 | 0.6 | 0.04 | 0.06 | 0.7 |
| 9 | Invention example | Ni-plated steel foil | A | 30 | 0.5/1.0 | — | — | 0.76 | 0.76 | 751 | 0.7 | 0.30 | 0.10 | 0.9 |
| 10 | Comparative example | Ni-plated steel foil | A | 35 | 0.8/1.4 | — | — | 1.69 | 1.69 | 734 | 0.8 | 6.80 | 5.40 | 9.0 |
| 11 | Invention example | Ni-plated steel foil | A | 50 | 0.7/1.1 | — | — | 1.26 | 1.26 | 623 | 0.6 | 0.06 | 0.05 | 0.8 |
| 12 | Invention example | Ni-plated steel foil | A | 50 | 0.7/1.1 | 600 | 10 | 1.26 | 1.26 | 609 | 0.9 | 0.04 | 0.04 | 0.7 |
| 13 | Invention example | Ni-plated steel foil | A | 50 | 0.7/1.1 | 750 | 10 | 1.26 | 1.26 | 541 | 3.8 | 0.03 | 0.07 | 0.9 |
| 14 | Invention example | Ni-plated steel foil | A | 50 | 0.7/1.1 | 800 | 10 | 1.26 | 1.26 | 530 | 4.1 | 0.03 | 0.05 | 0.8 |
| 15 | Invention example | Ni-plated steel foil | A | 50 | 0.7/1.1 | 850 | 10 | 1.26 | 1.26 | 504 | 4.9 | 0.04 | 0.03 | 0.9 |
| 16 | Comparative example | Ni-plated steel foil | A | 50 | 0.7/1.1 | 900 | 10 | 1.26 | 1.26 | 430 | 7.2 | 5.20 | 6.70 | 8.4 |

TABLE 2-continued

| Steel Foil No. | | Material | Slab | Foil thickness (μm) | Minimum/maximum unit rolling load of each pass (kN/mm) | Heat treatment temperature (°C.) | Heat treatment time (sec.) | Plating thickness (μm) | | Tensile strength (MPa) | Elongation (%) | Surface defect area percentage | | Constant potential current value after 24 hours in alkali (μA/cm²) |
|---|---|---|---|---|---|---|---|---|---|---|---|---|---|---|
| | | | | | | | | First surface | Second surface | | | First surface | Second surface | |
| 17 | Invention example | Ni-plated steel foil | B | 50 | 0.5/0.9 | 800 | 10 | 1.26 | 1.26 | 565 | 4.2 | 0.20 | 0.00 | 0.9 |
| 18 | Invention example | Ni-plated steel foil | A | 10 | 0.8/1.2 | 800 | 5 | 0.25 | 0.25 | 620 | 3.5 | 0.80 | 1.10 | 2.2 |
| 19 | Invention example | Ni-plated steel foil | A | 10 | 1.0/1.2 | — | — | 0.25 | 0.25 | 786 | 0.7 | 1.20 | 1.00 | 1.9 |
| 20 | Comparative example | Ni-plated steel foil | A | 10 | 1.0/1.5 | 800 | 5 | 0.25 | 0.25 | 610 | 3.7 | 5.30 | 5.50 | 7.9 |

The invention claimed is:

1. An Ni-plated steel foil for nickel-hydrogen secondary battery current collectors comprising, by mass %,
C: 0.0001 to 0.0200%,
Si: 0.0001 to 0.0200%,
Mn: 0.005 to 0.300%,
P: 0.001 to 0.020%,
S: 0.0001 to 0.0100%,
Al: 0.0005 to 0.1000%,
N: 0.0001 to 0.0040%,
one or both of Ti and Nb: 0.800% or less respectively, and
a balance of Fe and impurities, and
having an Ni plating layer on both surfaces,
wherein, an Ni plating layer thickness of each of a first surface and second surface of the Ni-plated steel foil is greater than or equal to 0.15 μm,
a thickness of the Ni-plated steel foil is 5 to 50 μm,
a tensile strength is over 400 MPa but no greater than 1200 MPa, and
a surface defect area percentage is less than or equal to 5.00% for each of the first surface and second surface of the Ni-plated steel foil.

2. The Ni-plated steel foil for nickel-hydrogen secondary battery current collectors according to claim 1 having a breaking elongation of greater than or equal to 3%.

3. The Ni-plated steel foil for nickel-hydrogen secondary battery current collectors according to claim 1 wherein the thickness of the Ni-plated steel foil is 10 to 30 μm.

4. The Ni-plated steel foil for nickel-hydrogen secondary battery current collectors according to claim 1 wherein the thickness of the Ni plating layer on the first surface and second surface of the Ni-plated steel foil is 0.20 to 1.50 μm.

5. A nickel-hydrogen secondary battery current collector comprising the Ni-plated steel foil for nickel-hydrogen secondary battery current collectors according to claim 1.

6. A nickel-hydrogen secondary battery comprising a positive electrode current collector on which a positive electrode active material layer, a separator, a negative electrode active material layer, and a negative electrode current collector are sequentially laid, in which nickel-hydrogen secondary battery, at least one of the positive electrode current collector and the negative electrode current collector is the nickel-hydrogen secondary battery current collector according to claim 5.

7. The Ni-plated steel foil for nickel-hydrogen secondary battery current collectors according to claim 2 wherein the thickness of the Ni-plated steel foil is 10 to 30 μm.

8. The Ni-plated steel foil for nickel-hydrogen secondary battery current collectors according to claim 2 wherein the thickness of the Ni plating layer on the first surface and second surface of the Ni-plated steel foil is 0.20 to 1.50 μm.

9. The Ni-plated steel foil for nickel-hydrogen secondary battery current collectors according to claim 3 wherein the thickness of the Ni plating layer on the first surface and second surface of the Ni-plated steel foil is 0.20 to 1.50 μm.

10. A nickel-hydrogen secondary battery current collector comprising the Ni-plated steel foil for nickel-hydrogen secondary battery current collectors according to claim 2.

11. A nickel-hydrogen secondary battery current collector comprising the Ni-plated steel foil for nickel-hydrogen secondary battery current collectors according to claim 3.

12. A nickel-hydrogen secondary battery current collector comprising the Ni-plated steel foil for nickel-hydrogen secondary battery current collectors according to claim 4.

13. A nickel-hydrogen secondary battery comprising a positive electrode current collector on which a positive electrode active material layer, a separator, a negative electrode active material layer, and a negative electrode current collector are sequentially laid, in which nickel-hydrogen secondary battery, at least one of the positive electrode current collector and the negative electrode current collector is the nickel-hydrogen secondary battery current collector according to claim 10.

14. A nickel-hydrogen secondary battery comprising a positive electrode current collector on which a positive electrode active material layer, a separator, a negative electrode active material layer, and a negative electrode current collector are sequentially laid, in which nickel-hydrogen secondary battery, at least one of the positive electrode current collector and the negative electrode current collector is the nickel-hydrogen secondary battery current collector according to claim 11.

15. A nickel-hydrogen secondary battery comprising a positive electrode current collector on which a positive electrode active material layer, a separator, a negative electrode active material layer, and a negative electrode current collector are sequentially laid, in which nickel-hydrogen secondary battery, at least one of the positive electrode current collector and the negative electrode current collector is the nickel-hydrogen secondary battery current collector according to claim 12.

* * * * *